US008688628B2

(12) United States Patent
Riemers

(10) Patent No.: US 8,688,628 B2
(45) Date of Patent: Apr. 1, 2014

(54) NESTED QUEUED TRANSACTION MANAGER

(75) Inventor: Bill C. Riemers, Stoney Creek (CA)

(73) Assignee: Red Hat, Inc., Raleigh, NC (US)

(*) Notice: Subject to any disclaimer, the term of this patent is extended or adjusted under 35 U.S.C. 154(b) by 1504 days.

(21) Appl. No.: 12/040,086

(22) Filed: Feb. 29, 2008

(65) Prior Publication Data
US 2009/0222822 A1 Sep. 3, 2009

(51) Int. Cl.
G06F 17/30 (2006.01)

(52) U.S. Cl.
USPC .......................................... 707/609

(58) Field of Classification Search
None
See application file for complete search history.

(56) References Cited

U.S. PATENT DOCUMENTS

| | | | | |
|---|---|---|---|---|
| 4,615,001 A | * | 9/1986 | Hudgins, Jr. .................. | 718/102 |
| 5,778,179 A | * | 7/1998 | Kanai et al. ................... | 709/203 |
| 5,878,206 A | * | 3/1999 | Chen et al. ..................... | 714/19 |
| 5,940,839 A | * | 8/1999 | Chen et al. .................... | 1/1 |
| 6,343,296 B1 | * | 1/2002 | Lakhamraju et al. ........... | 1/1 |
| 6,636,593 B1 | * | 10/2003 | MeLampy et al. ....... | 379/114.15 |
| 7,155,462 B1 | | 12/2006 | Singh et al. | |
| 7,313,560 B2 | * | 12/2007 | Dilley et al. ................... | 1/1 |
| 7,320,005 B2 | * | 1/2008 | Li et al. ......................... | 1/1 |
| 7,386,552 B2 | * | 6/2008 | Kitamura et al. ............... | 1/1 |
| 7,584,131 B1 | * | 9/2009 | Kurtz et al. .................. | 705/36 R |
| 7,620,665 B1 | * | 11/2009 | George et al. .................. | 1/1 |
| 2002/0138483 A1 | * | 9/2002 | Bretl et al. ..................... | 707/8 |
| 2002/0161815 A1 | * | 10/2002 | Bischof et al. ................. | 709/101 |
| 2003/0069903 A1 | * | 4/2003 | Gupta et al. ................... | 707/204 |
| 2004/0162844 A1 | | 8/2004 | Thome et al. | |
| 2005/0262188 A1 | | 11/2005 | Mamou et al. | |
| 2005/0262193 A1 | | 11/2005 | Mamou et al. | |
| 2006/0059188 A1 | | 3/2006 | Shirogane et al. | |
| 2007/0011422 A1 | * | 1/2007 | Srinivasan et al. ............ | 711/165 |
| 2007/0162520 A1 | * | 7/2007 | Petersen et al. ............... | 707/202 |
| 2007/0299975 A1 | * | 12/2007 | Daschakowsky et al. .... | 709/228 |
| 2008/0114830 A1 | | 5/2008 | Welingkar et al. | |
| 2008/0270515 A1 | | 10/2008 | Chen et al. | |
| 2009/0063504 A1 | | 3/2009 | Banister et al. | |
| 2009/0063555 A1 | | 3/2009 | Fisher et al. | |
| 2009/0119476 A1 | * | 5/2009 | Jernigan et al. ............... | 711/204 |
| 2010/0174874 A1 | * | 7/2010 | Blainey et al. ................ | 711/152 |

OTHER PUBLICATIONS

Haerder et al. (Concepts for Transaction Recovery in Nested Transactions); Proceeding: SIGMOD '87 Proceedings of the 1987 ACM SIGMOD international conference on Management of data; 1987; pp. 239-248.*

(Continued)

Primary Examiner — Keith Vicary
(74) Attorney, Agent, or Firm — Lowenstein Sandler LLP

(57) ABSTRACT

A method and apparatus that manages transactions during a data migration. The transfer of data from an old database to a new database is structured as a set of small transactions. The transactions can be structured in a hierarchy of dependent transactions such that the transactions are nested or similarly hierarchical. A migration manager includes a set of transaction management methods or processes that enable the processing of the nested transactions thereby providing a higher level of granularity in transaction size and providing the ability to rollback small individual transactions as well as affected related transactions. The transaction management methods and processes manage a set of queues that are utilized by the migration manager to generate and execute the nested transactions.

16 Claims, 7 Drawing Sheets

(56) References Cited

OTHER PUBLICATIONS

Harris (Transactional Migrations Plugin); 2 pages; post dated Aug. 15, 2006, accessed on Dec. 7, 2011 at http://www.harukizaemon.com/2006/08/transactional-migrations-plugin.html.*

Red Hat, Inc. Notice of Allowance and Fee(s) Due for U.S. Appl. No. 12/040,543, mailed Dec. 3, 2010.
Red Hat, Inc. Final Office Action for U.S. Appl. No. 12/040,543, mailed Sep. 29, 2010.
Red Hat, Inc. Non-Final Office Action for U.S. Appl. No. 12/040,543, mailed May 26, 2010.

* cited by examiner

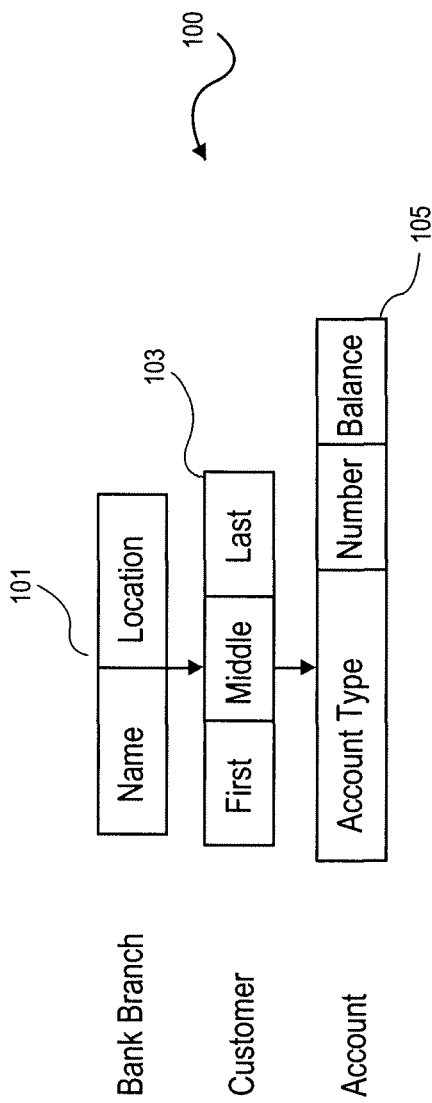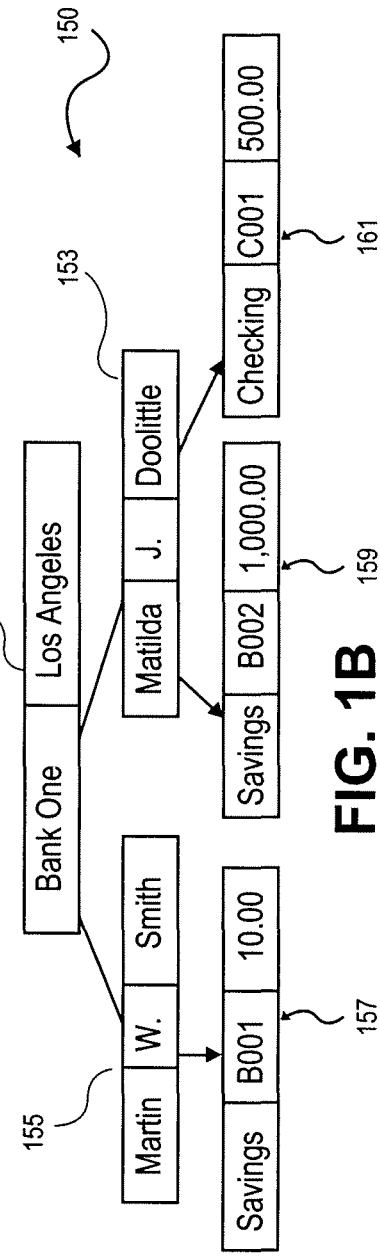

NESTED QUEUED TRANSACTION MANAGER

CROSS-REFERENCE TO RELATED APPLICATION

Cross-reference is made to a co-pending patent application by Bill C. Reimers for "DATA MIGRATION MANAGER" filed on the same date as the present application and commonly owned. The cross-referenced application is incorporated herein by reference.

TECHNICAL FIELD

Embodiments of the present invention relate to management of data migration between two databases. Specifically, the embodiments relate to a method and apparatus for managing transactions that transfer the data between the two databases.

BACKGROUND

Companies often upgrade or transition between database servers and systems to improve database response times or otherwise improve their database performance. Transferring the data from the old database system to the new database system is a time intensive and labor intensive task. In other circumstances, data from multiple databases with different schemas need to be merged.

A mapping between the two databases is created to enable a reorganization of the data in the one database to fit the organization of the other or new database. The new database system may have different methods for maintaining or selecting primary and foreign keys, organizing and storing tables and other differences from the old database system. The data from each record in the old database is read from the old database and then inserted into the new database according to the mapping.

The transfer of the data is performed by a program in communication with both the old database and the new database. This data transfer program starts a transaction with each database and reads each record from the old database and maps each record to the new database in a single transaction. The execution of this transaction can take a long time depending on the size of the old database. As a result, the old and new databases are inaccessible during the transaction and other programs are not able to access or utilize the old or new database. Further, the transaction cannot be easily interrupted or stopped. Such occurrences can disrupt the transfer process and corrupt it. Transactions must be completed in their entirety or rolled back. Thus, an interrupt of a large transaction forces a large rollback and then a complete restart to the transaction.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 1A is a diagram of one embodiment of a hierarchy of database record data.

FIG. 1B is a diagram of one embodiment of an example set of related records having the hierarchy of FIG. 1A.

DETAILED DESCRIPTION

Figure 2:
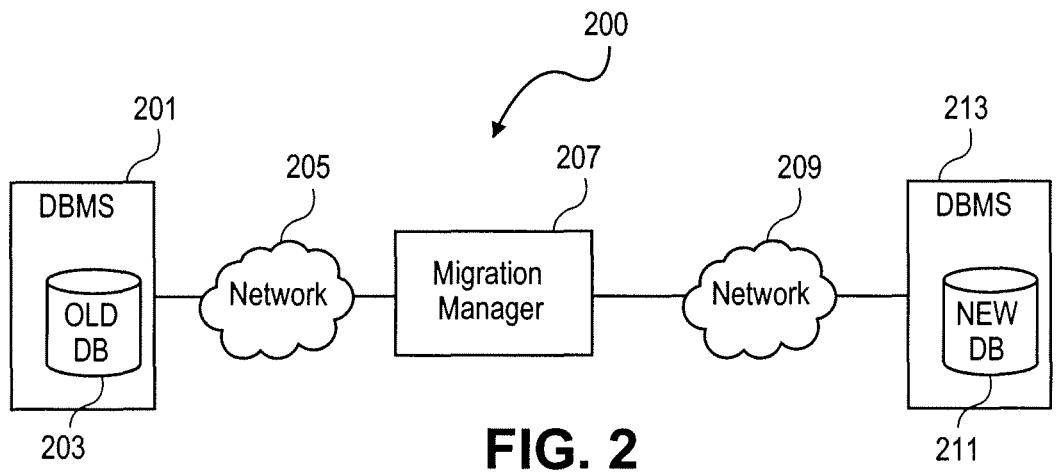
FIG. 2 is a diagram of one embodiment of a data migration system.

Described herein is a method and apparatus for managing transactions during a data migration. The transfer of data from an old database to a new database is structured as a set of small transactions. The transactions can be structured in a hierarchy of dependent transactions such that the transactions are nested or similarly hierarchical. A migration manager includes a set of transaction management methods or processes that enable the processing of the nested transactions thereby providing a higher level of granularity in transaction size and providing the ability to rollback small individual transactions as well as affected related transactions. The transaction management methods and processes manage a set of queues that are utilized by the migration manager to generate and execute the nested transactions.

FIG. 1A is a diagram of an example data hierarchy for a database. The hierarchy 100 of data is a simplified example. Actual data hierarchies can have any number of levels and inter-relations between the levels. Each layer in the hierarchy or each node in the hierarchical tree (in more complex hierarchies) represents a separate record or set of records. A 'set,' as used herein refers to any whole number of items including one item. Transferring any specific record with dependent or interrelated records can require that data related to the transfer of those related or dependent records be resolved before the transfer of the specific record can be completed. Each record can be transferred as a separate transaction. The resolution of dependencies may be affected by use of recursive or iterative calls to transfer the related records that creates a set of nested transactions to be resolved.

In the example hierarchy, a highest level record may be a bank branch record 101. The bank branch record includes fields such as a name and location field. The name field stores a name of a particular branch and the location field stores an address or geographical information about a branch (e.g., coordinates). Implicit or explicit fields of the record establish relationships with customer records 103. Fields that reference the customer records 103 are foreign keys, which must uniquely identify the appropriate customer records 103.

The customer record includes fields for the first, middle and last name of a customer. Again, the record may include explicit or implicit fields that reference the bank branch that the customer belongs to and must include explicit or implicit fields that reference the account records 105 that belong to the customer. The fields that reference the account records 105 are foreign keys, which must uniquely identify the appropriate account records 105 belonging to that customer.

The account records 105 include fields specifying a type of account, an account number and a balance for each account. The record may also include explicit or implicit fields that reference the customer to which the account belongs.

Each of the records in the database also includes a primary key. A primary key is a unique identifier for each record or row in a table of a database. The primary key can be a single column of a row or a set of columns in the row. For example, a specific column of each row in a table or set of related tables in a database includes a unique alpha-numeric sequence that serves as a primary key for that row. Instead of a primary key, a record can use a unique composite key. Further, in some cases a temporary key can be used to map data when a primary key or composite key is not available.

Foreign keys are references between two tables. Foreign keys can be a set of columns in a referencing table that identify a set of columns in a row of another table. The foreign key for any record typically identifies a single record (i.e., row) in another table. In the example, a column in the customer record 103 identifies a specific account record 105. The foreign key could be the account number or a separate primary key of the account record.

FIG. 1B is a diagram of one embodiment of an example set of related records having the hierarchy of FIG. 1A. The example includes a small number of records with minimal inter-relationships for sake of clarity. One skilled in the art would understand that the principles, operations, structures and features described herein would also apply to more complex sets of records. The records 150 include the records of two customers at a particular bank branch. The bank branch is identified by a bank branch record 151. The bank branch record 151 stores a name of the bank "Bank One" and a location of the bank "Los Angeles." The bank branch has two customer records that belong to "Martin W. Smith" 155 and "Matilda J. Doolittle" 153. Three account records are associated with the two customer records, identifying bank accounts B001 157, B002 159 and C001 161. The account B002 is associated with both the customer accounts 153, 155 and represents a shared account. In this example, the bank branch record 151 would include foreign keys identifying each customer record 153, 155 and the customer records 153, 155 include foreign keys identifying account records 157, 159 and 161.

The example set of records helps to illustrate that while each record or a set of the records could be transferred to a new database, their inter-relationships may require that the transactions be structured in a nested manner. Specifically, if a new database utilized a different format for primary and foreign keys, then the foreign and primary keys for related records would need to be resolved before the other records could be finalized. A migration manager may start with a first record at the top of the hierarchy, in this example bank branch record 151. It includes a primary key and at least two foreign keys that refer to customer records 153, 155. In one example, the primary key for each record is assumed to form a part of the foreign keys for other records. Thus, when processing the top bank branch record as a first transaction, two new transactions are initiated to resolve the customer records 153, 155. The customer records 153, 155 are similarly dependent on foreign keys referencing the account records 157, 159 and 161. These foreign keys, in one example, are the account numbers. However, in the new database a different account numbering system is utilized. Thus, the transfer of the account records and the update of the account numbers need to be resolved before the customer records can be finalized. Additional transactions are then initiated to transfer these records, which have no further dependencies.

Once the transactions for the account records are completed, the account records will have updated account numbers and the foreign keys and new primary keys for the customer records can be determined. Once the customer records are converted then the bank branch records can be converted and committed using the new primary keys of the customer records as part of the foreign keys in the bank branch records. Thus, the recursive or iterative process works its way down a hierarchy of nesting transactions to lower level records dependent from the higher level records and then works its way back up the hierarchy as the lower levels are resolved.

The transaction management methods and processes along with a set of data management structures are utilized to track the state and order the operations necessary to complete the migration of data including the mapping of the data into the new database. In some embodiments, to minimize the extent of nesting default values or similar place holder values may be utilized in the mapping of data and the insert operations into the new database. These values are then corrected at a subsequent time after all of the relevant data has been mapped to the format of the new database.

FIG. 2 is a diagram of one embodiment of a data migration system. The system 200 includes an old database 203, a migration manager 207 and a new database 211. These components can communicate with one another over a network 205 or set of networks 205, 209. The networks 205, 209 can be any type of network including local area networks (LANs), wide area networks (WANs), such as the Internet or similar networks. In another embodiment, the components can be connected by direct links such as Universal Serial Bus (USB), IEEE 1394 links and similar communication mediums. The networks can be wireline or wireless networks or combinations thereof.

In one embodiment, the old database 203 is provided by a server or set of server machines executing a database management system 201. Any type of database can be provided including relational databases, object-oriented databases and similar databases. The old database 203 can be of any size and hold any amount of data.

The new database 211 is provided by a server or set of server machines executing another database management system 213. Any type of database can be provided including relational databases, object-oriented databases and similar databases. The new database 211 can be of any size and hold any amount of data. Often the new database 211 will have a larger size, a different type of organization, improved performance characteristics or similar properties that motivate the transition of data from the old database 203 to the new database. 211. The old database 203 and new database 211 can be provided by the same vendor or different vendors. The old database 203 and new database 211 can also be executed on the same set of server machines or a separate set of server machines.

The migration manager 207 is an application that is executed by a computer in communication with the old database 203 and the new database 211. In one embodiment, the migration manager 207 can be executed on the server or set of servers that provide either the old database 203 or the new database 211. In another embodiment, the migration manager 207 is executed on a separate computer. The migration manager 207 retrieves data from the old database 203 and inserts the retrieved data into the new database 211. The migration manager 207 maps the data from a format or model utilized by the old database 203 into a format or model utilized by the new database 211.

Figure 3:
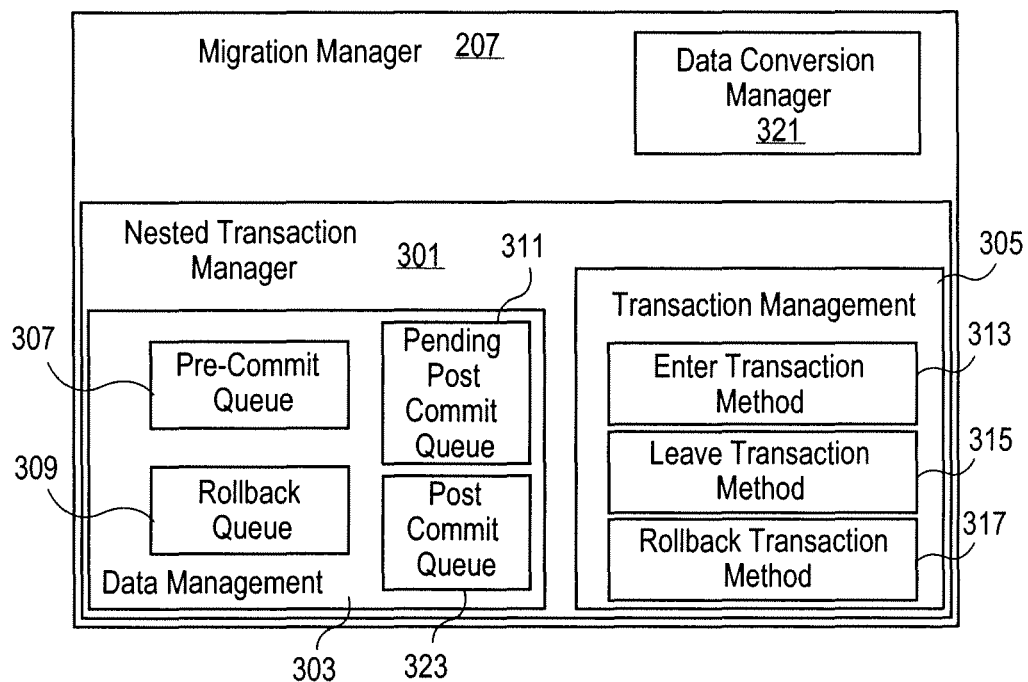
FIG. 3 is a diagram of one embodiment of a migration manager.

FIG. 3 is a diagram of one embodiment of a migration manager. The migration manager includes a nested transaction manager 301 and a data conversion manager 321. The migration manager 207 drives the retrieval of data from an old database, the conversion of the data to fit a new database and the insertion of that data into the new database. The migration manager 207 utilizes a data conversion manager 321 to transform or map the data from the old format or model to the new format or model. The data conversion manager 321 incorporates a set of data conversion methods for migrating records from the old database to the new database.

The migration manager 207 utilizes a nested transaction manager 301 to manage the transactions that are generated for each set of records. One skilled in the art would understand that the migration manager 207 could include other components or organize these components in other configurations. The embodiment described herein is provided by way of example for sake of clarity and the principles, features, structures and operations described in relation to this example embodiment can be applied to other configurations and embodiments.

The nested transaction manager 301 includes a data management component 303 and a transaction management component 305. The data management component 303 encompasses the data structures and storage components that are utilized by the migration manager 207 to track the state and organize the migration of data from the old database to the new database in a set of nested transactions. The transaction management component 305 encompasses a set of methods or programs that manage the transactions and the data in the data management component 303 to enable the nested transactions.

The data management component 303 includes a set of queues including a pre-commit queue 307, a rollback queue 309, a pending-post-commit queue 311, a post-commit queue 323 and/or similar data structures and storage devices. The nested transaction manager 301 can be configured to utilize or require any sub-set of these queues. Similarly, the nested transaction manager 301 can be configured to omit any set of these queues.

The pre-commit queue 307 is a data structure or storage device that orders and stores a set of actions associated with a transaction that has not yet been committed. The pre-commit queue 307 may be a first-in first-out (FIFO) queue, a stack or last-in first-out (LIFO) queue or similar data and storage structure. The pre-commit queue 307 tracks actions that are associated with transactions that have not been committed, because they are dependent on or rely on other transactions that have not been committed or similar actions.

The post commit queue 323 is a data structure or storage device that stores the actions associated with transactions that have been committed. The post-commit queue 323 may be a FIFO, LIFO or similar data or storage structure. The post-commit queue 323 actions have been executed. The post-commit queue 323 can be utilized to track completed actions, for logging, debugging or rollback methods or for similar functions.

The pending-post-commit queue 311 is a data structure or storage device that stores the actions associated with transaction that have been committed, but the associated actions have not yet been executed. As the actions are executed they are moved to the post-commit queue. The pending-post-commit queue 311 may be a FIFO, LIFO or similar data or storage structure.

A rollback queue 309 is a data structure or storage device that tracks or stores a set of actions that may need to be undone in the case of a failure, interruption or similar case where a rollback operation is performed. The data tracked in the rollback queue 309 allows the migration manager 207 to perform a rollback operation to return the old database and/or the new database to a previous condition or state. Specifically, the rollback queue allows for the reversal of recent operations and data structures in the migration manager 207. The rollback queue 309 may be structured as a FIFO, LIFO or similar data structure or storage structure.

This set of queues enables the nested transaction manager 301 to transfer the data of the old database to a new database in a set of small discrete inter-related transactions. The queues also enable rollback of transaction involving failed data transfers or similar errors. The queues can be of any size or organization dependent on the characteristics of the database to be transferred and the type of data to be transferred.

The transaction management component 305 includes a set of methods or similar programs including an "Enter Transaction" method 313, a "Leave Transaction" method 315 and a "Rollback Transaction Method" 317. These methods can be implemented as discrete computer software or hardware components. For example, the methods may form an application programming interface (API) or similar structure. These methods are called by other components such as the data conversion manager 321 to handle the start, end and failure of individual transactions.

The enter transaction method 313 is called by the migration manager 207 to initiate a new transaction. The enter transaction method 313 can initiate a new transaction or a nested transaction. The execution of this method is discussed in greater detail herein below in relation to FIG. 5.

The leave transaction method 315 is called by the migration manager 207 to end or exit a transaction including a nested transaction. The leave transaction method 315 alters the data management component queues as detailed herein below in relation to FIG. 6.

The rollback transaction method 317 is called by the migration manager 207 in response to a failure such as a failed insert into the new database or similar occurrence. The rollback transaction method 317 returns the old and new databases to previous states that reverse the effects of the failed operation. The execution of this method is discussed in greater detail below in relation to FIG. 7.

Figure 4:
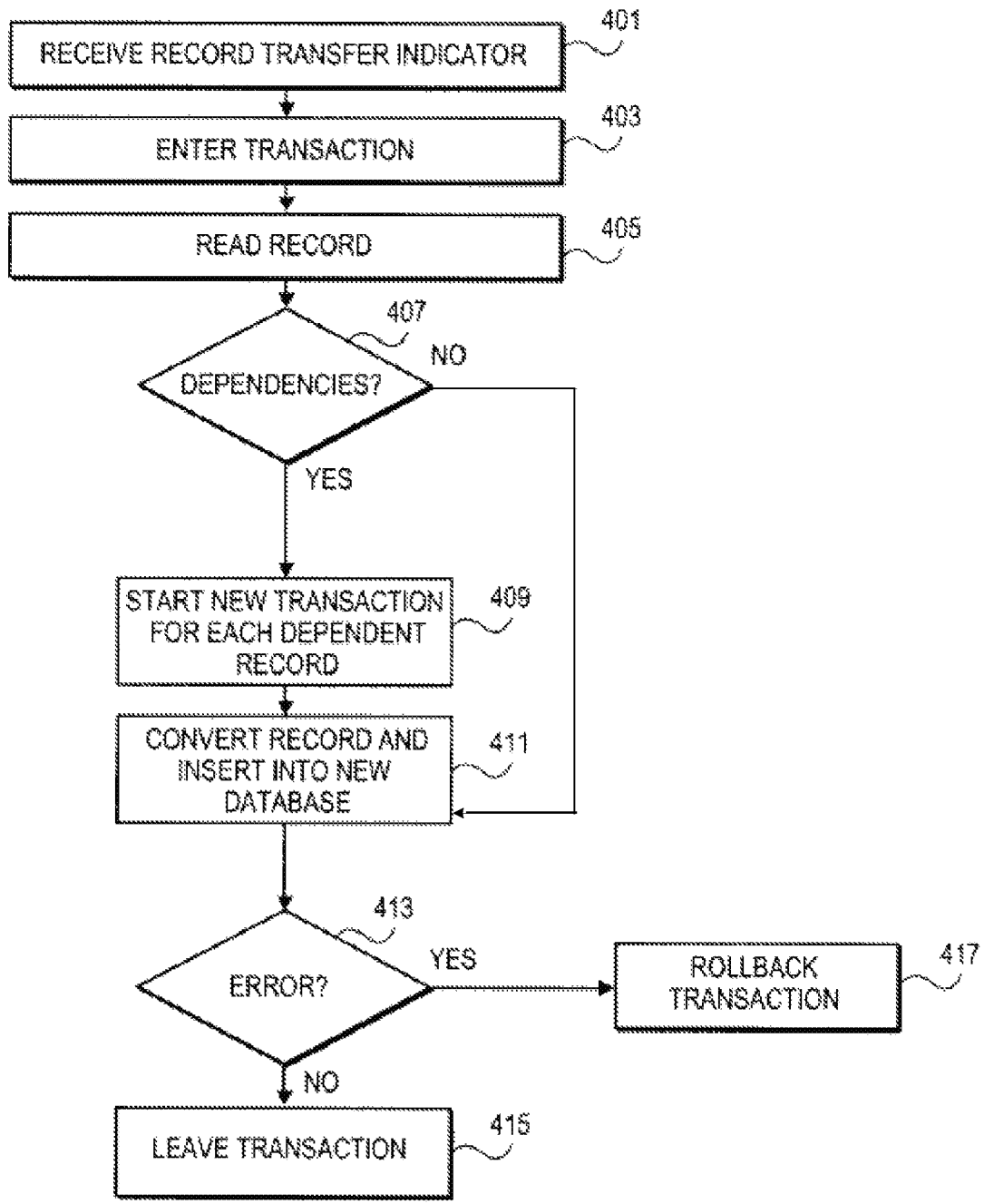
FIG. 4 is a flowchart of one embodiment of a migration process.

FIG. 4 is a flowchart of one embodiment of a migration process. The migration process can generate any number of transactions or nested transactions. A separate transaction can be initiated for each record to be migrated. This level of granularity allows a large database to be migrated piece-meal instead of in a single large transaction. Use of small record size transactions does not tie down each of the databases involved in the migration for long periods of time thereby making the databases available for other interaction.

A process of transferring a record can be initiated by the selection or designation of a record for transfer by a user or an application (block 401). The process can receive the record as a parameter or an indicator of the record. The record can then be retrieved using the indicator. Upon receiving the record or record indicator, the process initiates a transaction (block 403). A transaction, as used herein, refers to a discrete unit of interaction with a database management system (DBMS) or similar system. The transaction is handled in a coherent and reliable way such that it is independent of the processing of other transactions. The transaction is atomic; it is either entirely completed or aborted. The DBMS will execute the transaction such that the properties of atomicity, consistency, isolation and durability are maintained for each transaction.

If a record has not been received in its entirety as a parameter, then any portion of the record that was not received as a parameter is read from the old database (block 405). The record from the old database can also be read to check the accuracy of the received record data. In one embodiment, any dependencies are determined before or in the process or converting the record to the format of the new database (block 407). Dependencies may be primary keys, foreign keys or similar data referenced within the record that requires the conversion or migration of other records or similar actions. For each dependency, a separate transaction is initiated (block 409). Such transactions are referred to herein as "nested transactions," as they will be processed and resolved prior to the current transaction. Any number or levels of nesting can occur. The nesting may be limited to a certain number of levels, certain types of records or limited based on similar criteria. In these cases, default or dummy values are used in place of the dependent data and then updated at a later time when the dependent records have been migrated.

After each dependent record has been migrated or if no dependencies were found, then the record is converted to the format of the new database (block 411). The conversion can be a simple copying of data from one field to another corresponding field or can involve an application of a function or algorithm to derive, split, combine or similarly generate data that fits the format of the new database record. Primary and foreign keys are updated to fit the format of the new database records and using the already migrated dependent records, if necessary.

The converted database record is inserted into the new database. If an error does not occur during the insertion (block 413), then the transaction can be committed through a leave transaction method (block 415). If an error occurs during the insertion (block 413), or if at any point in the process an error occurs, then a rollback transaction 417 method can be called.

Figure 5:
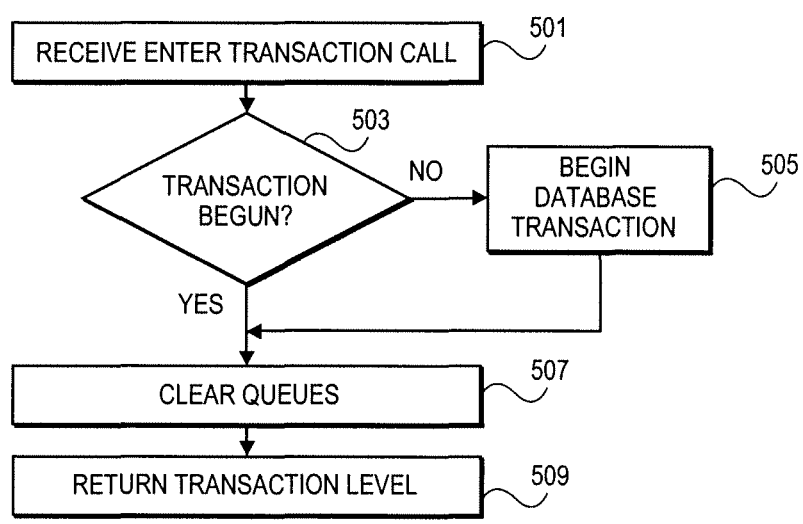
FIG. 5 is a flowchart of one embodiment of an enter transaction process.

FIG. 5 is a flowchart of one embodiment of an enter transaction process. In one embodiment, the enter transaction method can be called by the migration manager at the beginning of the data transfer to initiate the transfer of the first selected record (block 501). The enter transaction method can also be called subsequently to initiate a nested transaction to transfer a dependent or related record. The enter transaction method may be called by the migration manager or other data conversion or transaction management methods.

The enter transaction method determines whether a transaction is already in progress (block 503). This may be determined by checking a status tracking data structure, examination of the data management queues, checking for an open communication channel or transaction between the old database and the new database or similar action. If no transaction has been started then a transaction is initiated (block 505). The initiation of the transaction can include the opening of communication between any of the system components related to the transfer of the data, the update of the transaction status, the initialization or clearing of data management component structures (block 507) or similar actions.

In one embodiment, if a transaction has already been initiated then the new transaction may be recorded or tracked. Some queues in the data management component may be cleared (block 507) or similarly updated. In another embodiment, no actions are taken to affect the data management component, open a communication channel or similarly affect the migration manager or the component of the migration manager.

The enter transaction method may return the transaction level of the transaction initiated by the process. For example, the transaction can be a start or top level of the data hierarchy if it is the first transaction initiated by a user or program for a selected record or a lower level (i.e., nested transaction) initiated to migrate a dependent record (block 509). Transaction levels can be identified by an alpha-numeric value or similar indicator. In another embodiment, the enter transaction method similarly records or stores the status of a transaction being 'open' or 'in progress' in a status data structure for other methods to be able to check and verify any transaction information. The level of each currently open transaction can be tracked in a status data structure.

Figure 6:
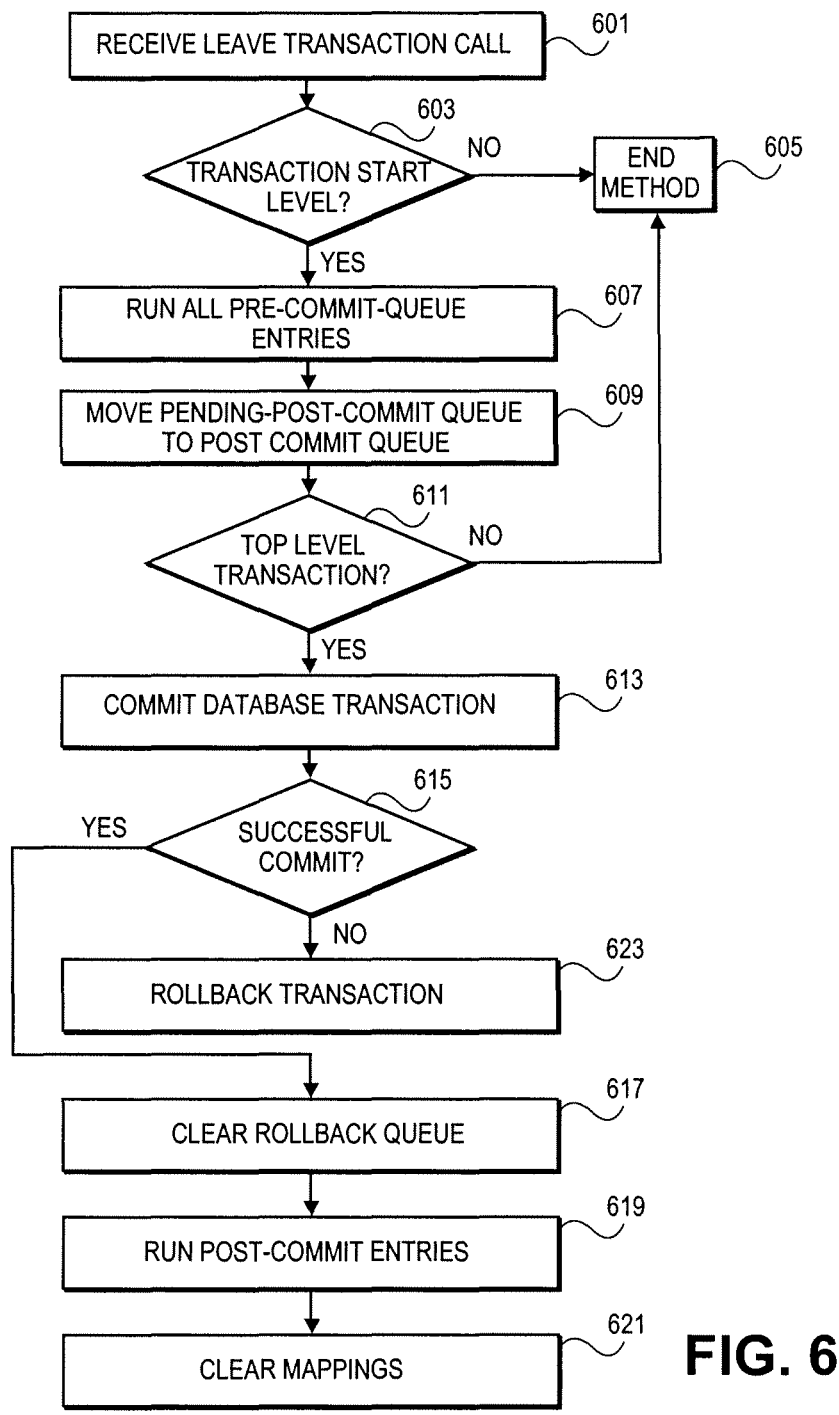
FIG. 6 is a flowchart of one embodiment of a leave transaction process.

FIG. 6 is a flowchart of one embodiment of a leave transaction process. In one embodiment, the leave transaction method can be called by the migration manager at the end of the data transfer to end the transfer of a record or set of records from the old database to the new database (block 601). The leave transaction method can also be called to end a nested transaction of a dependent or related record. The leave transaction method may be called by the migration manager, data conversion methods or other transaction management methods. The migration manager, data conversion methods or the transaction management methods may end transactions that are nested within the first or original transaction.

The leave transaction method determines whether the current level of a transaction is a start level transaction (block 603). A start level transaction is a transaction that is not nested. If the current transaction level is not a start level transaction, then no further action may be taken (block 605). The specific nested transaction can be labeled as ended in any tracking data structure.

If the leave transaction has been called and the transaction is the top or start level, then the leave transaction method attempts to reorganize or update the data management component, such as the various queues of the data management component. All pre-commit queue entries are executed (block 607). The pre-commit queue entries can be moved upon execution or in anticipation thereof to the pending-post-commit queue (block 609). As the pending-post-commit queue entries are executed or resolved then the entries are moved to the post-commit queue.

A determination is made if the transaction is a top level transaction, that is, the transaction is at a top of a database hierarchy (block 611). The handling of a top level transaction indicates that the entirety of the dependent records in the database has been migrated. If the transaction is not at the top level, the leave transaction is ended (block 605). If the transaction is a top level transaction, then the transaction is committed (block 613). A check is then made to determine whether the commit of the transaction was successful (block 615). If the transaction committed successfully, then the rollback queue is cleared (block 617). The postcommit entries are run (block 619). The post-commit entries can be operations that update foreign keys where default or dummy values were utilized or similar operations appropriate to execute at the time that the migration of the records in the old database has completed. Optionally, the mappings between the databases are cleared (block 621). If the commit is not successful, then the rollback transaction operation is called (block 623).

Figure 7:
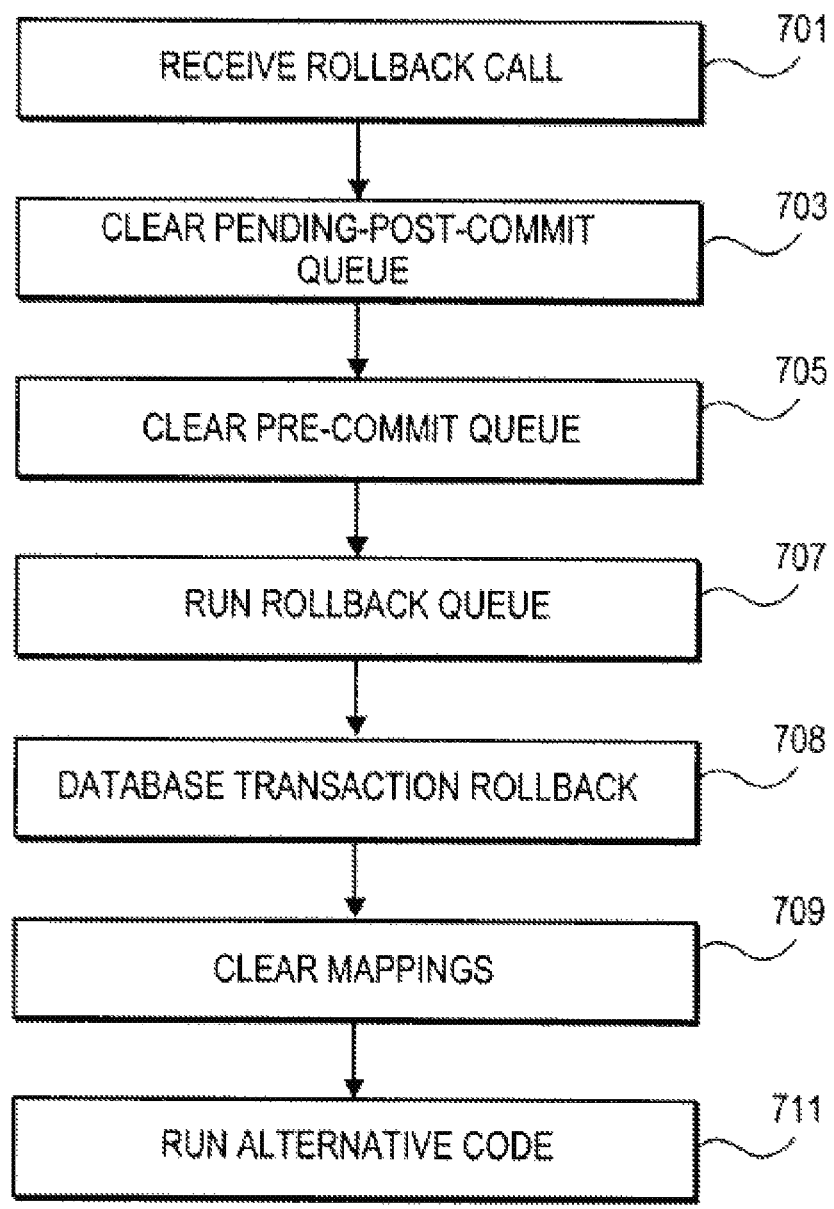
FIG. 7 is a flowchart of one embodiment of a roll back process.

FIG. 7 is a flowchart of one embodiment of a roll back process. The rollback method can be called by the migration manager, data conversion methods or other transaction management component (block 701). The rollback method is called in response to an error such as a failed insert or similar error. These errors can occur at any time and be asynchronous to the execution of the migration manager. Many of the operations of this process can be performed in parallel, especially in a multi-threaded environment.

The rollback method clears the pending-post-commit queue (block 703). The pre-commit queue is also cleared (block 705). The actions in these queues will not be performed as the rollback method reverts the old and new databases to a prior state. The rollback queue is then executed (block 707). Executing the rollback queue reverses recent operations and returns the old and new databases to a previous state. The rollback of the database transaction is initiated by a command or message to the database management system (block 708).

In one embodiment, any mappings associated with the failed transaction or operation are cleared (block 709). The mappings may be instructions or data structures that assist the migration manager in converting records from a format of the old database to that of a new database. However, a flaw in a mapping may cause the error that forced the rollback operation. If such an error in mapping is the cause of the rollback it may be automatically cleared or flagged for further review.

In one embodiment, in place of the operations that were cleared during the rollback, an alternative set of operations may be executed (block 711). These alternate instructions, mappings or similar data can attempt to perform the transfer and conversion of the data from the old database to the new database in a different manner. For example, instead of using a nested transaction, dummy or default values may be used for unresolved fields of a recorded during transfer. Once any associated or faulty mappings are cleared and any alternative code is executed then the rollback operation may be ended.

Figure 8:
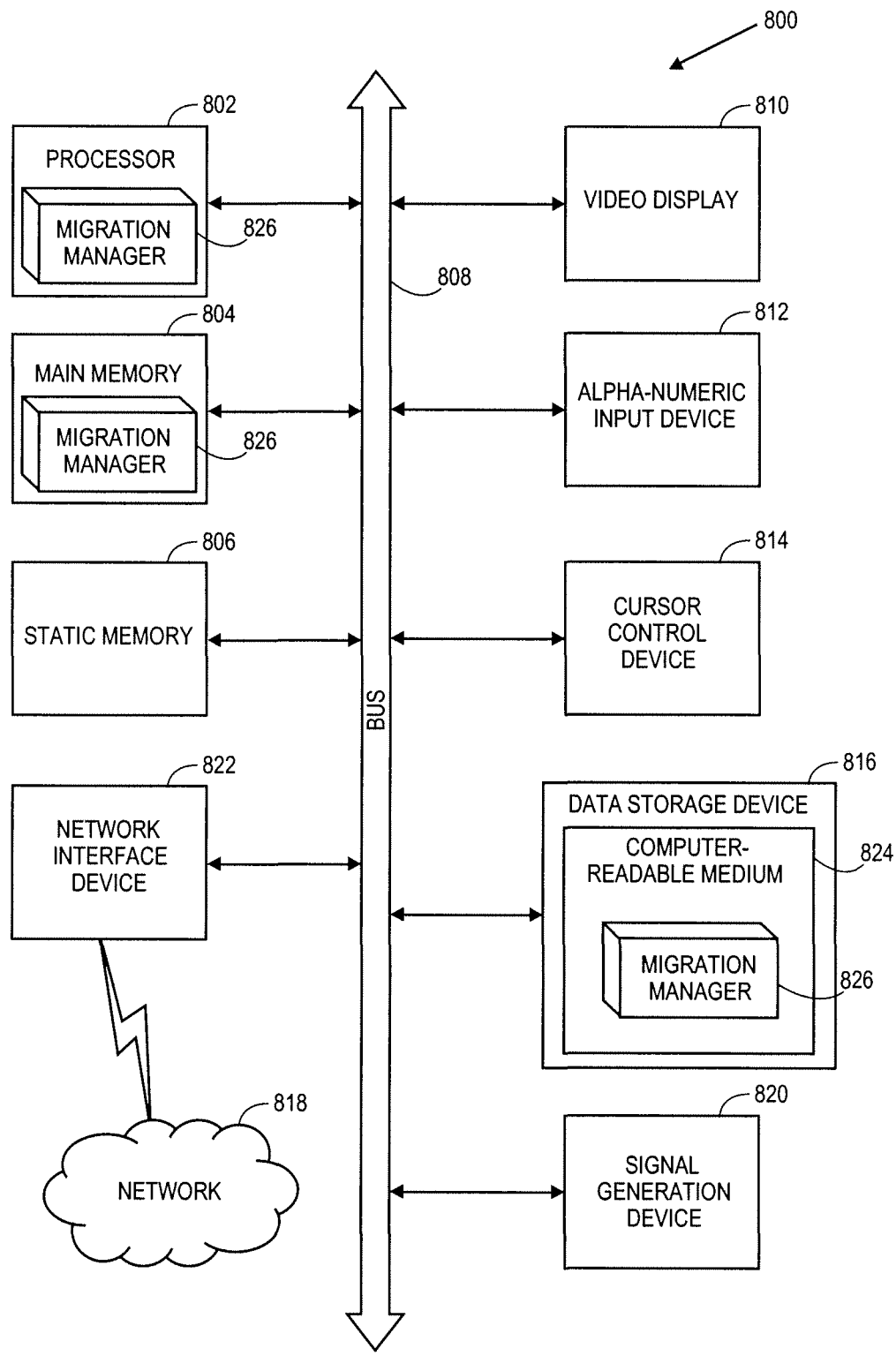
FIG. 8 is a diagram of one embodiment of a computer system supporting the migration manager.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine (e.g., the computer executing the migration manager) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 816 (e.g., a data storage device in the form of a drive unit, which may include fixed or removable computer-readable medium), which communicate with each other via a bus 808.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the migration manager logic 826 for performing the operations and steps discussed herein.

The computer system 800 may further include a network interface device 822. The computer system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions (e.g., migration manager logic 826) embodying any one or more of the methodologies or functions described herein. The logic 826 may also reside, completely or at least partially, within the main memory 804 and/or within the processing device 802 during execution thereof by the computer system 800, the main memory 804 and the processing device 802 also constituting machine-readable storage media. The logic 826 may further be transmitted or received over a network 818 via the network interface device 822.

The machine-readable storage medium 824 may also be used to store the migration manager logic 826 persistently. While the machine-readable storage medium 824 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It would be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise in the above discussion, it is appreciated that throughout the description, discussions utilizing terms such as "processing," "computing," "generating," "determining," "selecting," "displaying," "searching," "receiving," "updating," "modifying," "assigning," "requesting," "clearing," "running," "committing," "moving," "executing," "closing," "detecting," "initiating," "returning" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein above are not inherently related to any particular computer or other apparatus. Various general purpose systems may be used with programs in accordance with the teachings herein or it may prove convenient to construct more specialized apparatus to perform the required method steps. The required structure for a variety of these systems will appeared in the description above. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for managing transactions through a migration manager has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
receiving a call to end a transaction of transferring data from a first database to a second database within a hierarchy of nested transactions;
determining a transaction level of the transaction in the hierarchy is a transaction start level; and
moving, by a processor, at least one entry for the transaction in a pending-post-commit queue to a post-commit queue as at least one action associated with the transaction is executed in response to determining the transaction level is a transaction start level, wherein the pending-post-commit queue stores an entry for at least one action that is not executed and is associated with the transaction and the post-commit queue stores an entry for at least one action that has been executed and is associated with the transaction.

2. The method of claim 1, further comprising:
running all pre-commit queue entries for the transaction.

3. The method of claim 1, further comprising:
clearing a rollback queue for the transaction.

4. The method of claim 1, further comprising:
determining whether the transaction is a top level transaction.

5. The method of claim 4, wherein the transaction is the top level transaction, further comprising:
executing post-commit entries; and
committing a transaction.

6. The method of claim 1, further comprising:
detecting an error in the transaction; and
initiating a rollback operation in response to the error.

7. The method of claim 6, wherein the rollback operation comprises:
clearing the pending-post-commit queue;
clearing a pre-commit queue; and
running a rollback queue.

8. The method of claim 1, further comprising:
receiving a request to begin the transaction; and
determining whether the transaction has begun, in response to the request to begin the transaction.

9. The method of claim 8, further comprising:
indicating a transaction start level after beginning the transaction.

10. A non-transitory computer readable medium, having instructions stored therein, which when executed by a processor, cause the processor to perform operations comprising:
receiving a call to end a transaction of transferring data from a first database to a second database within a hierarchy of nested transactions;
determining a transaction level of the transaction in the hierarchy is a transaction start level; and
moving, by the processor, at least one entry for the transaction in a pending-post-commit queue to a post-commit queue as at least one action associated with the transaction is executed in response to determining the transaction level is a transaction start level, wherein the pending-post-commit queue stores an entry for at least one action that is not executed and is associated with the transaction and the post-commit queue stores an entry for at least one action that has been executed and is associated with the transaction.

11. The non-transitory computer readable medium of claim 10, wherein the operations further comprise:
running all pre-commit queue entries for the transaction.

12. The non-transitory computer readable medium of claim 10, wherein the operations further comprise:
clearing a rollback queue for the transaction.

13. The non-transitory computer readable medium of claim 10, wherein the operations further comprise:
determining whether the transaction is a top level transaction;
executing post-commit entries; and
closing a communication channel.

14. The non-transitory computer readable medium of claim 10, wherein the operations further comprise:
detecting an error in the transaction; and
initiating a rollback operation in response to the error.

15. A system comprising:
a memory;
a processing device coupled to the memory;

a nested transaction manager executed from the memory by the processing device to manage a migration of data from a first database to a second database by generating a set of nested transactions;

a data management module executed from the memory by the processing device to track a status of commands carrying out the data migration in the set of nested transactions; and a transaction management module executed from the memory by the processing device to receive a call to end a transaction of transferring data from the first database to the second database within a hierarchy of the nested transactions, determine a transaction level of the transaction in the hierarchy is a transaction start level, and move at least one entry for the transaction in a pending-post-commit queue to a post-commit queue as at least one action associated with the transaction is executed in response to determining the transaction level is a transaction start level, wherein the pending-post-commit queue stores an entry for at least one action that is not executed and is associated with the transaction and the post-commit queue stores an entry for at least one action that has been executed and is associated with the transaction.

16. The system of claim 15, wherein the transaction management module comprises any one of an enter-transaction method, leave-transaction method or a rollback method.

* * * * *